United States Patent
Higashi

(10) Patent No.: US 10,260,513 B2
(45) Date of Patent: Apr. 16, 2019

(54) CORRECTED RPM CALCULATION METHOD FOR FINDING A CORRECTED RPM OF A COMPRESSOR USING A SOUND VELOCITY OF AN INLET GAS SUCKED INTO THE COMPRESSOR, AND RPM OF THE COMPRESSOR, AND A REFERENCE STATE QUANTITY

(71) Applicant: MITSUBISHI HITACHI POWER SYSTEMS, LTD., Kanagawa (JP)

(72) Inventor: Ryo Higashi, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 477 days.

(21) Appl. No.: 14/889,296

(22) PCT Filed: Jun. 26, 2014

(86) PCT No.: PCT/JP2014/066991
§ 371 (c)(1),
(2) Date: Nov. 5, 2015

(87) PCT Pub. No.: WO2014/208668
PCT Pub. Date: Dec. 31, 2014

(65) Prior Publication Data
US 2016/0123341 A1 May 5, 2016

(30) Foreign Application Priority Data

Jun. 27, 2013 (JP) ................................ 2013-135167

(51) Int. Cl.
*G01C 17/38* (2006.01)
*F04D 27/02* (2006.01)
(Continued)

(52) U.S. Cl.
CPC ....... *F04D 27/0246* (2013.01); *F04D 27/001* (2013.01); *F04D 27/02* (2013.01);
(Continued)

(58) Field of Classification Search
CPC .......................... F04D 27/0246; F04D 27/001
(Continued)

(56) References Cited

U.S. PATENT DOCUMENTS 3,844,684 A * 10/1974 Kawamura ......... F04B 39/0207
417/13
4,651,518 A * 3/1987 McLaughlin ............. F02C 9/28
60/39.281
(Continued)

FOREIGN PATENT DOCUMENTS

CN 1629495 6/2005
CN 101688541 3/2010
(Continued)

OTHER PUBLICATIONS

International Search Report dated Sep. 16, 2014 in corresponding International Application No. PCT/JP2014/066991.
(Continued)

*Primary Examiner* — Caleb E Henry
(74) *Attorney, Agent, or Firm* — Wenderoth, Lind & Ponack, L.L.P.

(57) ABSTRACT

An RPM of a compressor is sensed by an RPM meter, and a sound velocity of an inlet gas sucked into the compressor is sensed by a sound velocity meter. A corrected RPM computation unit finds a corrected RPM of the compressor using a reference state quantity determined by a reference specific heat ratio, a reference gas constant, and a reference temperature of the inlet gas; the RPM sensed by the RPM meter, and the sound velocity sensed by the sound velocity meter.

16 Claims, 7 Drawing Sheets

(51) Int. Cl.
*F04D 27/00* (2006.01)
*F04D 29/32* (2006.01)
*G01P 3/00* (2006.01)
*G01P 5/24* (2006.01)
*G01P 21/00* (2006.01)

(52) U.S. Cl.
CPC .............. *F04D 29/321* (2013.01); *G01P 3/00* (2013.01); *G01P 5/24* (2013.01); *G01P 21/00* (2013.01)

(58) Field of Classification Search
USPC .......................................................... 702/96
See application file for complete search history.

(56) References Cited

U.S. PATENT DOCUMENTS

| | | | | |
|---|---|---|---|---|
| 4,864,816 A * | 9/1989 | Benvenuti | ............... | F01D 17/06 60/792 |
| 4,971,516 A * | 11/1990 | Lawless | .............. | F04D 27/0207 415/1 |
| 6,176,074 B1 * | 1/2001 | Thompson | ............ | F01D 21/045 60/39.091 |
| 2004/0115064 A1 * | 6/2004 | Bleile | ..................... | F02B 37/12 417/34 |
| 2006/0138986 A1 * | 6/2006 | Park | .......................... | H02P 6/18 318/400.24 |
| 2006/0288702 A1 * | 12/2006 | Gokhale | ................. | F02B 37/18 60/602 |
| 2007/0044951 A1 * | 3/2007 | Horn | ................. | B60H 1/00492 165/203 |
| 2011/0229303 A1 * | 9/2011 | Winkes | ................... | F04D 19/02 415/1 |
| 2012/0121376 A1 | 5/2012 | Huis In Het Veld | | |
| 2012/0247115 A1 | 10/2012 | Sasahara et al. | | |
| 2013/0236296 A1 * | 9/2013 | Collopy | .................... | F02C 9/20 415/162 |
| 2015/0219379 A1 * | 8/2015 | Sun | ........................... | F25B 1/10 62/115 |
| 2015/0240713 A1 * | 8/2015 | Kraft | ........................ | F02C 3/10 60/774 |

FOREIGN PATENT DOCUMENTS

| | | |
|---|---|---|
| JP | 3-44237 | 7/1991 |
| JP | 10-306312 | 11/1998 |
| JP | 2012-528989 | 11/2012 |
| KR | 10-2010-0091953 | 8/2010 |
| WO | 2009/058975 | 5/2009 |
| WO | 2010/040734 | 4/2010 |
| WO | 2012/132062 | 10/2012 |
| WO | 2012/132612 | 10/2012 |
| WO | 2012/177582 | 12/2012 |

OTHER PUBLICATIONS

Written Opinion of the International Searching Authority dated Sep. 16, 2014 in corresponding International Application No. PCT/JP2014/066991.
Notification of Reasons for Refusal dated Apr. 14, 2017 in corresponding Korean Application No. 10-2015-7033450 (with machine translation).
First office Action dated Jul. 4, 2016 in corresponding Chinese Application No. 201480029991.4 (with English translation).

* cited by examiner

CORRECTED RPM CALCULATION METHOD FOR FINDING A CORRECTED RPM OF A COMPRESSOR USING A SOUND VELOCITY OF AN INLET GAS SUCKED INTO THE COMPRESSOR, AND RPM OF THE COMPRESSOR, AND A REFERENCE STATE QUANTITY

TECHNICAL FIELD

The present invention relates to a corrected RPM calculation method for a compressor, a control method for a compressor, and devices for implementing these methods. This application claims priority based on Japanese Patent Application No. 2013-135167 filed in Japan on Jun. 27, 2013, of which the contents are incorporated herein by reference.

BACKGROUND ART

When operating a compressor, it is necessary to avoid the vibration phenomenon known as surging that is accompanied by pressure fluctuations or backflow within a compressor, from the point of view of protecting the compressor and the nearby equipment.

Surging can be prevented by controlling the actual pressure ratio of the compressor to be smaller than the limiting pressure ratio. The limiting pressure ratio is determined at each corrected RPM of the compressor. The corrected RPM is a value determined by the compressor actual RPM N, as well as by the specific heat ratio κ of the inlet gas, the gas constant R of the inlet gas, and the absolute temperature T of the inlet gas. Therefore, the corrected RPM varies in accordance with the temperature, composition, and the like of the inlet gas. In other words, when the temperature, composition, or the like of the inlet gas varies, the corrected RPM varies accordingly, and as a result, the limiting pressure ratio also varies.

Therefore, in Patent Document 1 below, a method is proposed for determining the limiting pressure ratio in accordance with the corrected RPM, by sensing the temperature of the inlet gas, and finding the corrected RPM in accordance with this temperature. Also, in Patent Document 1, a method is proposed for determining the limiting pressure ratio in accordance with the corrected RPM by sensing the temperature and density of the inlet gas, and finding the corrected RPM in accordance with these temperature and density. In addition, in Patent Document 1, a method is proposed for determining the limiting pressure ratio in accordance with the corrected RPM by sensing the temperature of the inlet gas, as well as sensing the composition of the inlet gas by gas chromatography, and finding the corrected RPM in accordance with these temperature and composition.

CITATION LIST

Patent Document

Patent Document 1: WO/2012/132062

SUMMARY OF INVENTION

Technical Problem

The method disclosed in the above Patent Document 1 is basically valid when the state, for example, the temperature, the composition, or the like, of the inlet gas sucked into the compressor varies. However, in the method disclosed in the above Patent Document 1, in order to find the corrected RPM of the compressor, a comparatively long time is required to sense the temperature, the composition, or the like of the inlet gas, which has the problem that it is not possible to respond to sudden variations in temperature or composition. In addition, in the method disclosed in the above Patent Document 1, the specific heat ratio κ and the gas constant R of the inlet gas are estimated from the density or the like of the inlet gas, which has the problem that it is not possible to accurately find the corrected RPM of the compressor.

Therefore, it is an object of the present invention to provide a corrected RPM calculation method, a compressor control method, and devices implementing these methods that are capable of accurately finding the corrected RPM in a short period of time.

Solution to Problems

A corrected RPM calculation device as one aspect of the present invention for solving the above problems includes:

an acceptance unit that receives the RPM of a compressor sensed by an RPM meter and the sound velocity of inlet gas sucked into the compressor sensed by a sound velocity meter; and a corrected RPM computation unit that finds a corrected RPM of the compressor using a reference state quantity determined by a reference specific heat ratio, a reference gas constant, and a reference temperature of the inlet gas in a reference state; the sound velocity received by the acceptance unit; and the RPM received by the acceptance unit.

The parameters that determine the corrected RPM include the reference state quantity of the inlet gas, the actual state quantity of the inlet gas, and the actual RPM of the compressor. Of these parameters, the reference state quantity of the inlet gas is a predetermined fixed value. On the other hand, the actual state quantity of the inlet gas varies as the composition or the temperature of the inlet gas varies, and the actual RPM of the compressor also varies as the operating state of the compressor varies.

Here, the state quantity of the inlet gas is the quantity determined by the specific heat ratio, the gas constant, and the temperature of the inlet gas, and is the sound velocity of the inlet gas itself. Therefore, by sensing the sound velocity of the inlet gas, the actual state quantity of the inlet gas can be obtained.

Therefore, in the corrected RPM calculation device, of the parameters that define the corrected RPM, the RPM of the compressor that is one of the variable parameters is acquired from the RPM meter, and the state quantity of the inlet gas that is the remaining variable parameter is acquired from the sound velocity meter. Then, in the corrected RPM calculation device, the corrected RPM is found using the predetermined reference state quantity of the inlet gas, the RPM sensed by the RPM meter, and the sound velocity (=state quantity) sensed by the sound velocity meter.

Therefore, in the corrected RPM calculation device, the corrected RPM can be found more accurately than by estimating the actual state quantity of the inlet gas from the temperature or the like of the inlet gas.

Also, the delay time of the sound velocity meter and the RPM meter in responding to changes in the objects being sensed is extremely short. Therefore, in the corrected RPM calculation device, the corrected RPM can be found in an extremely short period of time compared with finding the corrected RPM based on one of the parameters defining the corrected RPM sensed by a temperature gauge, gas chromatography, or the like.

Here, the corrected RPM calculation device may include the RPM meter and the sound velocity meter.

In this case, in the corrected RPM calculation device, the sound velocity meter may include a sonic transmitter and a sonic receiver disposed opposite each other on a pipe through which the inlet gas flows, in a direction perpendicular to the axis of the pipe. The pipe is a member that forms a flow path through which the inlet gas flows, and examples of the pipe include not only pipes such as steel pipes with a ring-shaped cross-section but also duct-like members formed in a rectangular cross-section from thin plate.

In the corrected RPM calculation device, the sonic transmitter and the sonic receiver of the sound velocity meter are disposed opposite each other in a direction perpendicular to the axis of the pipe through which the inlet gas flows. Therefore, in the corrected RPM calculation device, an average value of the sound velocity of the inlet gas at each position in the cross-section of the pipe can be obtained. Also, in the corrected RPM calculation device, if the composition of the inlet gas changes, the sound velocity of the inlet gas at only a specific position in the axial direction of the pipe, in other words, in the direction of flow of the inlet gas within the pipe can be obtained. Therefore, in the corrected RPM calculation device, the change in the sound velocity associated with a change in the composition of the inlet gas can be sensed more accurately than if the sonic transmitter and the sonic receiver are disposed opposite each other in the axial direction of the pipe.

Also, any of the corrected RPM calculation devices described above may include an output unit that outputs the corrected RPM found by the corrected RPM computation unit.

In this corrected RPM calculation device, by outputting the corrected RPM, an operator or the like of the compressor can check the status of the compressor.

A compressor control device as one aspect of the present invention for solving the above problems includes:

any of the corrected RPM calculation devices as described above; and a surge control unit that controls a final control element to prevent surging of the compressor.

The acceptance unit receives at least the outlet pressure of the compressor sensed by a pressure gauge. The surge control unit determines the limiting pressure ratio or the pre-limiting pressure ratio that is smaller than the limiting pressure ratio by a predetermined amount, with respect to the corrected RPM found by the corrected RPM calculation device, using a predetermined relationship between the corrected RPM and the limiting pressure ratio or the pre-limiting pressure ratio of the compressor. Then, the surge control unit compares the limiting pressure ratio or the pre-limiting pressure ratio with the actual pressure ratio of the compressor determined by the outlet pressure received by the acceptance unit, and controls the final control element in accordance with the comparison result.

There is a constant relationship between the corrected RPM and the limiting pressure ratio or the pre-limiting pressure ratio regarding surging of the compressor. Therefore, by obtaining the corrected RPM, the limiting pressure ratio or the pre-limiting pressure ratio at the corrected RPM can be obtained.

This control device includes the corrected RPM calculation device, so an accurate corrected RPM can be obtained in an extremely short period of time relative to the variation in the composition or the like of the inlet gas. Thus, in the compressor control device, an accurate limiting pressure ratio or pre-limiting pressure ratio can be obtained within an extremely short period of time relative to the variation in the composition or the like of the inlet gas. Therefore, with the control device, the accurate limiting pressure ratio or pre-limiting pressure ratio and the actual pressure ratio of the compressor can be compared in an extremely short period of time relative to the change in the composition or the like of the inlet gas.

Therefore, with this control device, even when the state quantity of the fuel gas changes, and the potential for occurrence of surging of the fuel gas compressor increases, this potential can be accurately determined and a control process can be executed against surging before the occurrence of surging.

Here, in the compressor control device, the final control element may include an inlet flow rate regulator that regulates the flow rate of the inlet gas, and the surge control unit may output to the inlet flow rate regulator an instruction to increase the flow rate of the inlet gas in accordance with the comparison result.

Also, in any of the above compressor control devices, the final control element may include a recirculation flow rate regulator that regulates the flow rate of the gas that returns to the inlet side of the compressor from among the gas output from the compressor, and the surge control unit may output an instruction to the recirculation flow rate regulator to increase the flow rate of the gas returned to the inlet side in accordance with the comparison result.

Also, in any of the above compressor control devices, the final control element may include an extraction flow rate regulator that regulates the flow rate of the gas extracted from the compressor, and the surge control unit may output an instruction to the extraction flow rate regulator to increase the flow rate of the gas extracted in accordance with the comparison result.

Also, in any of the above compressor control devices, the final control element may include a trip final control element that stops the compressor, and the surge control unit may output an instruction to the trip final control element to execute an operation to stop the compressor in accordance with the comparison result.

Also, in any of the above compressor control devices, the surge control unit may determine the pre-limiting pressure ratio for the corrected RPM found by the corrected RPM calculation device, and when the actual pressure ratio becomes equal to or greater than the pre-limiting pressure ratio, may output an instruction to the final control element.

Also, any of the above compressor control devices may further include: an efficiency calculation unit that calculates the efficiency of the compressor in accordance with the corrected RPM found by the corrected RPM computation unit and the actual pressure ratio of the compressor determined from the outlet pressure received by the acceptance unit, using a predetermined relationship among the corrected RPM, the pressure ratio, and the efficiency of the compressor; and an output unit that outputs the efficiency calculated by the efficiency calculation unit.

In this control device, the degree of degradation of the performance of the compressor can be checked by comparing the efficiency output from the output unit and the actual efficiency of the compressor.

Compression equipment as one aspect of the invention for solving the above problems includes:

any of the compressor control devices described above; the compressor; and the final control element.

Here, in the compression equipment, the compressor may compresses fuel gas, which is burned by a combustor as the gas.

A corrected RPM calculation method as one aspect of the invention for solving the above problems includes:

a RPM sensing step of sensing an RPM of a compressor;

a sound velocity sensing step of sensing the sound velocity of inlet gas that is gas sucked into a compressor; and a corrected RPM computation step of finding a corrected RPM of the compressor using a reference state quantity determined by a reference specific heat ratio, a reference gas constant, and a reference temperature of the inlet gas in a reference state; the sound velocity sensed in the sound velocity sensing step; and the RPM sensed in the RPM sensing step.

A compressor control method as one aspect of the invention for solving the above problems includes:

executing the corrected RPM calculation method; and executing an outlet pressure sensing step of sensing the outlet pressure of the compressor, and a surge control step of controlling operation of a final control element to prevent surging of the compressor.

In the surge control step, the limiting pressure ratio or the pre-limiting pressure ratio that is smaller than the limiting pressure ratio by a predetermined amount is determined with respect to the corrected RPM found by executing the corrected RPM calculation method, using a predetermined relationship between the corrected RPM and the limiting pressure ratio or the pre-limiting pressure ratio of the compressor. Then, the limiting pressure ratio or the pre-limiting pressure ratio is compared with the actual pressure ratio of the compressor determined from the outlet pressure sensed in the outlet pressure sensing step, and the final control element is controlled in accordance with the comparison result.

Here, in the compressor control method, in the surge control step, the pre-limiting pressure ratio for the corrected RPM found by executing the corrected RPM calculation method may be determined, and if the actual pressure ratio becomes equal to or greater than the pre-limiting pressure ratio, an instruction may be output to the final control element.

A compressor degradation determination method as one aspect of the invention for solving the above problems executes:

the corrected RPM calculation method; an outlet pressure sensing step of sensing the outlet pressure of the compressor; a pressure ratio computation step of finding the actual pressure ratio of the compressor determined from the outlet pressure sensed in the outlet pressure sensing step; a first efficiency calculation step of calculating an actual efficiency of the compressor; a second efficiency calculation step of calculating an efficiency of the compressor in accordance with the corrected RPM found by executing the corrected RPM calculation method and the pressure ratio found in the pressure ratio computation step, using a predetermined relationship among the corrected RPM, the pressure ratio, and the efficiency of the compressor; and a comparison step of comparing the efficiency calculated in the first efficiency calculation step and the efficiency calculated in the second efficiency calculation step.

Advantageous Effects of Invention

According to one aspect of the present invention, an accurate corrected RPM can be found in an extremely short period of time, even if the temperature, the composition, or the like of the inlet gas varies.

DESCRIPTION OF EMBODIMENTS

The following is a detailed description of an embodiment of a gas turbine plant that includes compression equipment according to the present invention, and various modifications, with reference to the drawings.

Figure 1:
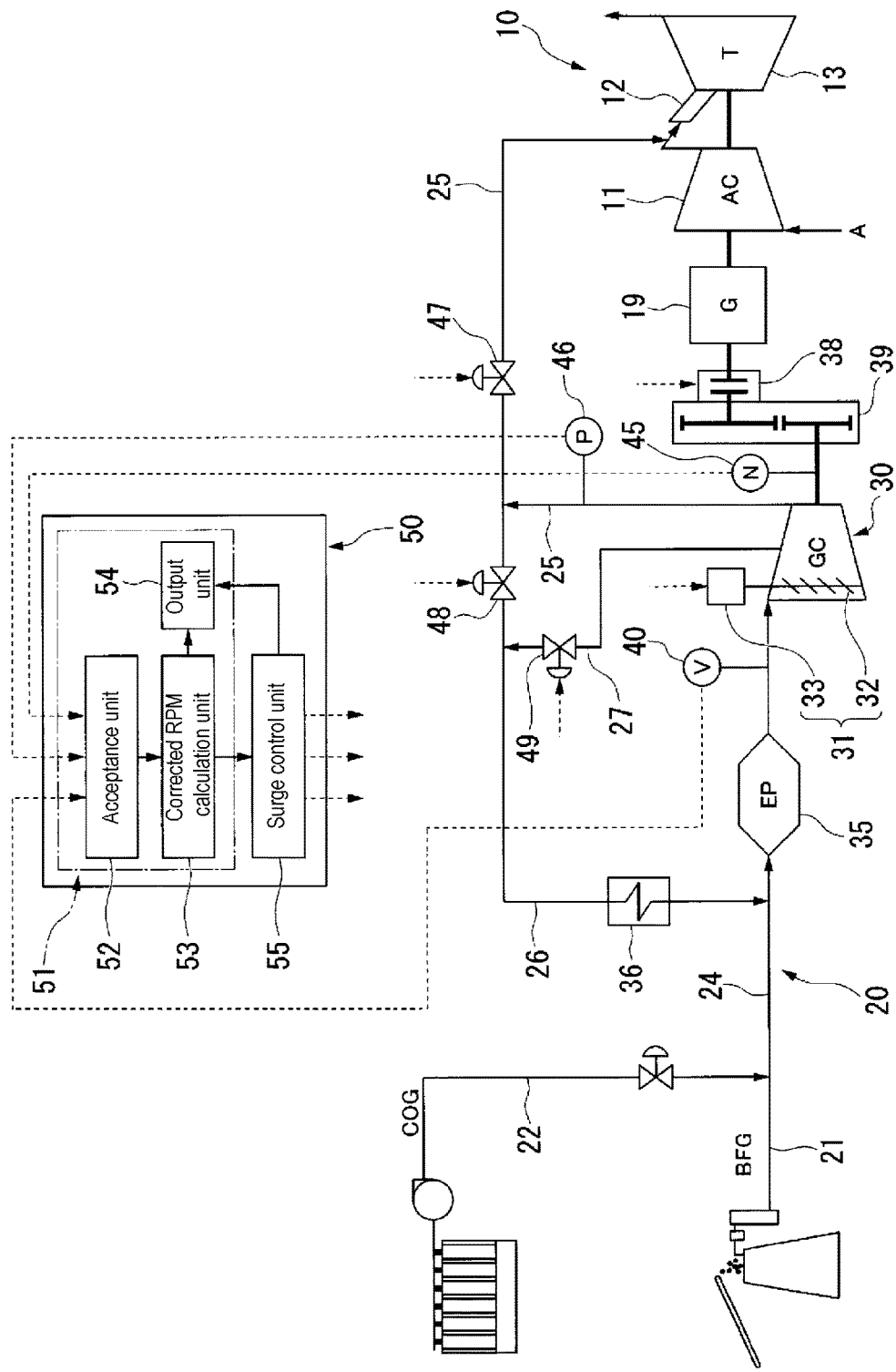
FIG. 1 is a system diagram illustrating a gas turbine plant according to an embodiment of the present invention.

As illustrated in FIG. 1, a gas turbine plant according to the present embodiment includes a gas turbine 10 driven by a fuel gas, a generator 19 that generates electrical power by being driven by the gas turbine 10, and fuel gas equipment 20 that supplies fuel gas to the gas turbine 10.

The gas turbine 10 includes an air compressor 11 that compresses air, a combustor 12 that combusts a fuel gas in the air compressed by the air compressor to generate high-temperature combustion gas, and a turbine 13 that is driven by the combustion gas.

The fuel gas equipment 20 includes a blast furnace gas (BFG) line 21 through which BFG passes as a low calorie fuel gas from a blast furnace of an ironworks; a coke oven gas (COG) line 22 through which COG passes as a high calorie fuel gas from a coke furnace of a coke plant; a fuel line 24 through which passes as a fuel gas either one or both of the BFG from the BFG line 21 and the COG from the COG line 22; an axial flow fuel gas compressor 30 that compresses the fuel gas; a fuel supply line 25 that supplies the fuel gas that has been compressed in the fuel gas compressor 30 to the combustor 12; a fuel return line 26 that returns fuel gas in the fuel supply line 25 to the fuel line 24; and an extraction line 27 that delivers fuel gas extracted from the fuel gas compressor 30 to the fuel return line 26.

The fuel gas equipment 20 further includes an electrostatic precipitator (EP) 35 that collects dust etc in the fuel gas that passes through the fuel line 24, and a cooler 36 that cools the fuel gas that passes through the fuel return line 26. The electrostatic precipitator 35 is provided on the fuel line 24 on the downstream side or on the fuel gas compressor 30 side of the position where the fuel return line 26 joins the fuel line 24. The cooler 36 is provided on the fuel return line 26 between the position where the extraction line 27 joins the fuel return line 26 and the position where the fuel return line 26 joins the fuel line 24.

A sound velocity meter 40 that senses the sound velocity of the fuel gas passing through the fuel line 24 is provided on the fuel line 24 at a position downstream of the electrostatic precipitator 35. A supply flow rate regulation valve 47 that regulates the flow rate of the fuel gas flowing through the fuel supply line 25 and being delivered to the combustor 12, and a pressure gauge 46 that senses the pressure of the fuel gas discharged from the fuel gas compressor 30 are provided on the fuel supply line 25. A recirculation flow rate regulation valve (recirculation flow rate regulator) 48 that regulates the flow rate of the fuel gas being returned to the fuel line 24 from among the fuel gas that has flowed through the fuel supply line 25 is provided on the fuel return line 26 on the upstream side of the position where the extraction line 27 joins the fuel return line 26. An extraction flow rate regulation valve (extraction flow rate regulator) 49 that regulates the flow rate of fuel gas extracted from the fuel gas compressor 30 is provided on the extraction line 27

An inlet flow rate regulator 31 is provided on the fuel gas compressor 30 to regulate the inlet flow rate of fuel gas. The inlet flow rate regulator 31 includes an inlet guide vane (IGV) 32 provided at the inlet of the fuel gas compressor 30, and a guide vane drive device 33 that changes the degree of opening (IGV degree of opening) of the inlet guide vane 32. The rotational shaft of the fuel gas compressor 30 is mechanically connected to the rotational shaft of the generator 19 or the gas turbine 10 via a clutch 38 and a speed reducer 39. An RPM meter 45 that senses the RPM of the rotational shaft is provided on the fuel gas compressor 30.

The fuel gas equipment 20 further includes a compressor control device 50 that controls a final control element to prevent surging of the fuel gas compressor 30 based on the values sensed by the sound velocity meter 40, the RPM meter 45, and the pressure gauge 46. Here, the final control element is the inlet flow rate regulator 31. However, as will be described later, the final control element may be any one or a combination of a plurality of the inlet flow rate regulator 31, the recirculation flow rate regulation valve 48, the extraction flow rate regulation valve 49, the supply flow rate regulation valve 47, and the clutch 38.

The compressor control device 50 includes the sound velocity meter 40, the RPM meter 45, the pressure gauge 46, an acceptance unit 52 that receives values sensed by these sensors, a corrected RPM computation unit 53 that finds a corrected RPM using the sound velocity sensed by the sound velocity meter 40 and the RPM sensed by the RPM meter 45, a surge control unit 55 that outputs instructions to the inlet flow rate regulator 31 as the final control element using the corrected RPM, and an output unit 54 such as a display that outputs the values found by the corrected RPM computation unit 53 and the surge control unit 55. Note that in the present embodiment, a corrected RPM computation device 51 is configured from the acceptance unit 52, the corrected RPM computation unit 53, and the output unit 54. In addition, in the present embodiment, a corrected RPM calculation device is configured from the corrected RPM computation device 51, the sound velocity meter 40, and the RPM meter 45. In other words, the compressor control device 50 of the present embodiment is configured having the corrected RPM calculation device and the surge control unit 55.

Figure 2:
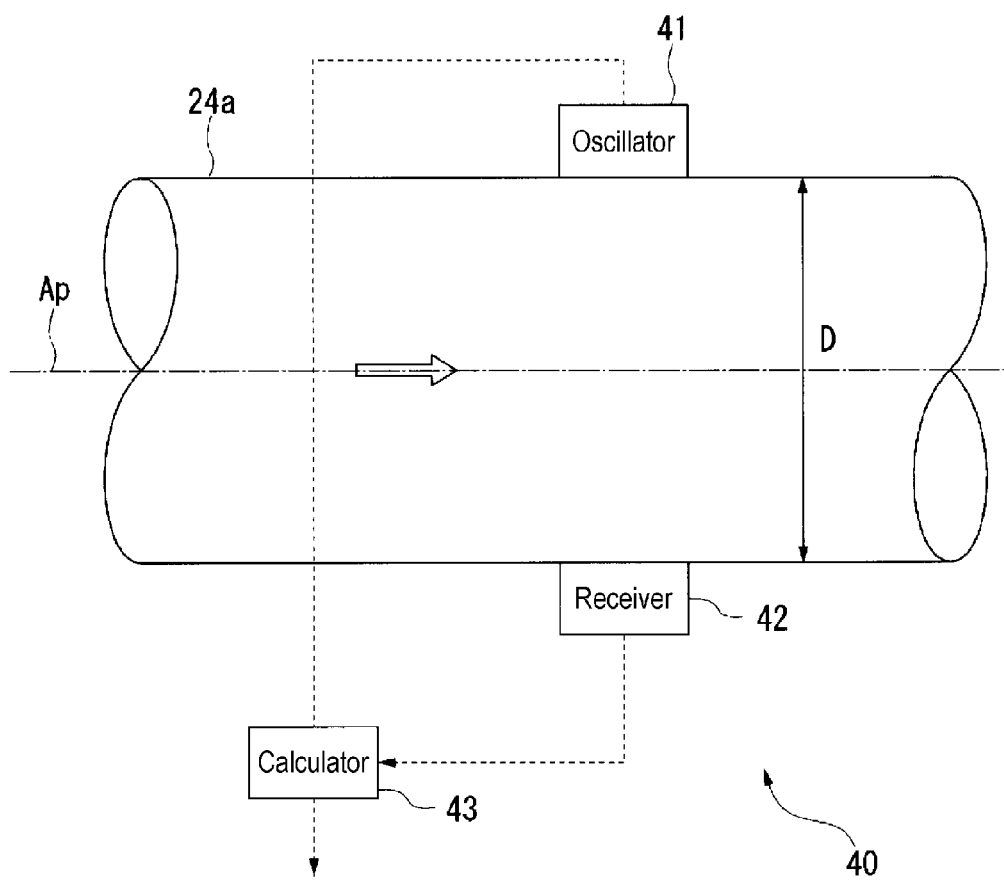
FIG. 2 is a schematic view illustrating the configuration of a sound velocity meter in the embodiment of the present invention.

As illustrated in FIG. 2, the sound velocity meter 40 includes a sonic transmitter 41 that transmits ultrasonic waves; a sonic receiver 42 that receives the ultrasonic waves transmitted by the sonic transmitter 41; and a computer 43 that finds the sound velocity of the gas present in the space between the sonic transmitter 41 and the sonic receiver 42 from the time from transmission of the ultrasonic wave by the sonic transmitter 41 until reception of the ultrasonic wave by the sonic receiver 42. The sonic transmitter 41 and the sonic receiver 42 are installed on a pipe 24a from which the fuel line 24 is configured and arranged opposite each other in a direction perpendicular to the axis Ap of the pipe 24a. The distance D between the sonic transmitter 41 and the sonic receiver 42, in other words, the internal diameter of the pipe 24a is set in advance in the computer 43. The computer 43 finds the sound velocity of the gas present in the space between the sonic transmitter 41 and the sonic receiver 42, in other words, the fuel gas sucked into the fuel gas compressor 30 using the time from transmission of the ultrasonic wave by the sonic transmitter 41 until reception of the ultrasonic wave by the sonic receiver 42, and the predetermined distance D mentioned above.

Figure 3:
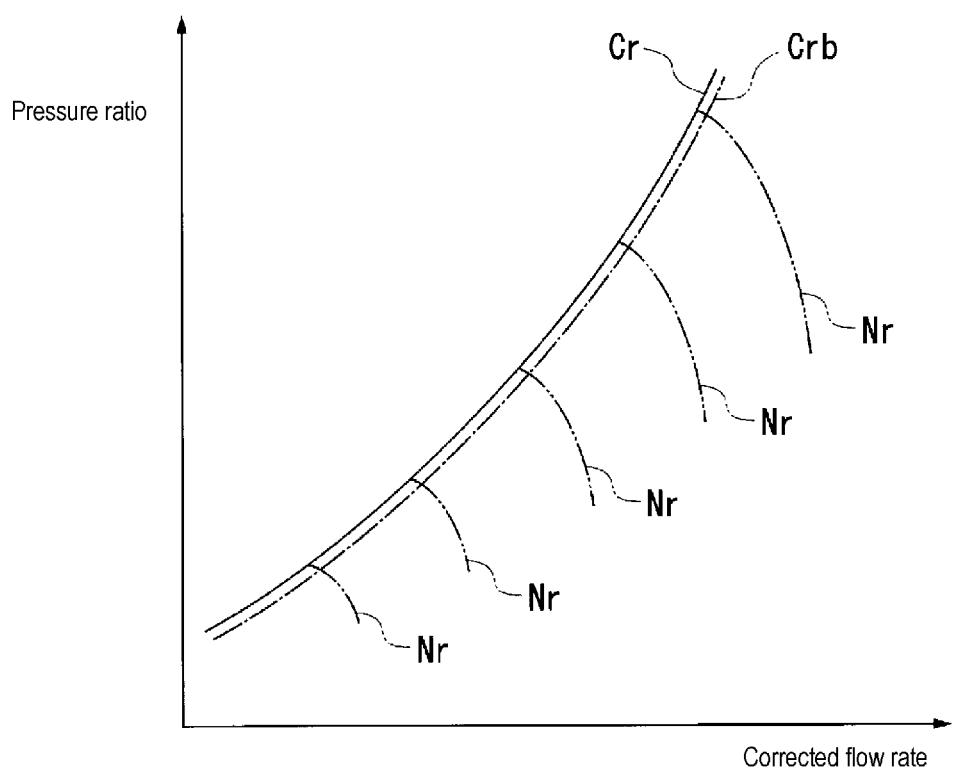
FIG. 3 is a graph showing the characteristics of a compressor.

Next, characteristics of the compressor are described using the graph shown in FIG. 3. Note that the horizontal axis of the graph is the corrected flow rate of the compressor, and the vertical axis is the pressure ratio of the compressor. Also, the limiting pressure ratio curve Cr that indicates the limiting pressure ratio at each corrected RPM, and the corrected RPM characteristic curve Nr that indicates the relationship between the corrected flow rate and the pressure ratio for each corrected RPM are shown on this graph.

First, the various parameters used in the description of the characteristics of the compressor are described.

The pressure ratio is the ratio of the pressure of the inlet gas to the pressure of the outlet gas. Therefore, the higher the pressure of the outlet gas with respect to the pressure of the inlet gas, the greater the pressure ratio.

The corrected flow rate is the actual mass flow rate of the inlet gas sucked into the compressor corrected into the flow rate in accordance with the state of the inlet gas, and is defined by the following equation (1).

$$G0 = G \times [\sqrt{(\kappa 0 RT / \kappa R0 T0)}](P/P0) \qquad (1)$$

where,
G0: Corrected flow rate
G: Actual mass flow rate of the inlet gas
κ0: Reference specific heat ratio of the inlet gas
κ: Actual specific heat ratio of the inlet gas
R0: Reference gas constant of the inlet gas
R: Actual gas constant of the inlet gas
T0: Reference temperature of the inlet gas
T: Actual temperature of the inlet gas
P0: Reference pressure of the inlet gas
P: Actual pressure of the inlet gas The corrected RPM is the RPM of the compressor corrected into an RPM in accordance with the state of the inlet gas sucked into the compressor, and is defined in accordance with the following equation (2).

$$N0 = N \times \sqrt{(\kappa 0 R0 T0)} / \sqrt{(\kappa RT)} \qquad (2)$$

where,
N0: Corrected RPM
N: Actual RPM

Of the parameters that define the corrected RPM, the actual RPM N, the actual specific heat ratio κ of the inlet gas, the actual gas constant R of the inlet gas, and the actual temperature T of the inlet gas are all variable parameters. On the other hand, the remaining parameters, the reference specific heat ratio κ0 of the inlet gas, the reference gas constant R0 of the inlet gas, and the reference temperature T0 of the inlet gas, are all parameters that are defined at the design stage of the compressor, and have fixed values.

The limiting pressure ratio is the pressure ratio at which surging occurs when the pressure ratio of the compressor exceeds this value. As shown in FIG. 3, the compressor limiting pressure ratio curve Cr is a curve in which the limiting pressure ratio increases as the corrected RPM increases.

If a certain corrected RPM is maintained relative to a variation in corrected flow rate, in other words, if the actual RPM of the compressor is maintained constant when the state of the inlet gas is constant, the pressure ratio suddenly decreases if the corrected flow rate is increased from the corrected flow rate at the limiting pressure ratio. In other words, the corrected RPM characteristic curve Nr at a certain corrected RPM describes the sharply downward sloping curve in the graph shown in FIG. 3.

There is a corrected RPM characteristic curve Nr for each corrected RPM. The characteristic curve Nr for a high corrected RPM has a higher corrected flow rate and pressure ratio than those of a characteristic curve Nr for a low corrected RPM.

The point of intersection of the corrected RPM characteristic curve Nr and the limiting pressure ratio curve Cr is the limiting pressure ratio at that corrected RPM. Thus, the limiting pressure ratio is uniquely defined with respect to the corrected RPM. Therefore, by preparing in advance the relationship between the corrected RPM and the limiting pressure ratio for each corrected RPM, provided the corrected RPM can be determined for a compressor in operation, the limiting pressure ratio can be actually found at that corrected RPM.

Therefore, in the present embodiment, for each corrected RPM, the relationship between the corrected RPM and the limiting pressure ratio or a pre-limiting pressure ratio that is smaller than the limiting pressure ratio by a predetermined amount (for example, by several percent of the limiting pressure ratio) is determined in advance, and this relationship is stored in advance in the surge control unit 55 of the compressor control device 50. Note that a pre-limiting pressure ratio curve Crb that shows the change in the pre-limiting pressure ratio with respect to changes in the corrected flow rate and the pressure ratio is a curve in which the limiting pressure ratio increases as the corrected flow rate increases, as with the limiting pressure ratio curve Cr, as shown in FIG. 3, but the pressure ratio is smaller than that of the limiting pressure ratio curve Cr by the predetermined amount.

As defined in equation (2) as described above, the corrected RPM N0 varies in accordance with the actual state quantity ($\sqrt{(\kappa RT)}$) of the inlet gas that is determined by the actual specific heat ratio $\kappa$ of the inlet gas, the actual gas constant R of the inlet gas, and the actual temperature T of the inlet gas.

As stated in the section on Background Art, in Patent Document 1, a method is proposed in which the temperature T of the inlet gas is sensed as one of the parameters defining the corrected RPM N0, and the corrected RPM N0 is found with respect to the temperature T, assuming the other parameters defining the corrected RPM N0 are constant. Also, in Patent Document 1, a method is proposed in which the temperature T and the density of the inlet gas are sensed, ($\kappa R$) according to the density is estimated, and the corrected RPM N0 is found with respect to the estimated ($\kappa R$) and temperature T. In addition, in Patent Document 1, a method is proposed in which the temperature T of the inlet gas is sensed and the composition of the inlet gas is sensed by gas chromatography, and based on the sensing result of the composition, $\kappa$ and R are estimated, and the corrected RPM N0 is found with respect to the estimated $\kappa$ and R and the temperature T.

In the method in which the temperature T of the inlet gas only is sensed, of the parameters that define the corrected RPM N0, all the parameters except the temperature T of the inlet gas are assumed to be constant, so if the composition of the inlet gas varies, an accurate corrected RPM N0 cannot be found.

Also, in the method in which the temperature T and the density of the inlet gas are sensed, ($\kappa R$) according to the density is estimated, so even if the composition of the inlet gas varies, the corrected RPM N0 can be found to a certain degree of accuracy. However, even with this method, ($\kappa R$) is estimated according to the density, so an accurate value of ($\kappa R$) cannot be found, and an accurate value of the corrected RPM N0 cannot be found.

In the method in which the temperature T of the inlet gas is sensed and the composition of the inlet gas is sensed by gas chromatography, $\kappa$ and R are estimated from the composition of the inlet gas, so it is possible to find accurate $\kappa$ and R. As a result, with this method, an accurate corrected RPM N0 can be found. However, sensing the composition of the inlet gas by gas chromatography requires several minutes or more, so after the composition of the inlet gas has changed, a corrected RPM N0 at the time of the change in composition of the inlet gas is obtained after several minutes or more have passed from the change. Therefore, when the composition of the inlet gas changes, it is anticipated that in many cases, it will not be possible to prevent surging of the compressor even if the compressor is controlled based on the limiting pressure ratio in accordance with the corrected RPM N0 found by this method. The method of sensing the composition of the inlet gas using gas chromatography is not a practical method for preventing surging of a compressor due to phenomena in which the composition of the inlet gas suddenly changes due to channeling in a blast furnace and the like.

Also, each of the methods proposed in Patent Document 1 is a method in which the temperature T of the inlet gas is sensed. When sensing the temperature of the inlet gas, if the temperature T of the inlet gas changes, the temperature after the change cannot be sensed until the sensing element of the temperature gauge has adapted to the temperature after the change. In other words, in order to sense the temperature T of the inlet gas with a temperature gauge, a certain amount of time is required from the point of time when the temperature has changed, so after the temperature of the inlet gas has changed, the corrected RPM N0 cannot be found until after that certain period of time has passed. Therefore, in order to prevent surging of the compressor, with the methods in which the temperature of the inlet gas is sensed, it is anticipated that in some cases, it will not be possible to prevent surging of the compressor due to the delay in controlling the compressor associated with the delay in sensing the temperature.

Here, the sound velocity V of the inlet gas is defined by the following equation (3).

$$V=\sqrt{(\kappa RT)} \tag{3}$$

Of the parameters that define the corrected RPM, apart from the actual RPM N, the parameter that changes is the actual state quantity ($\sqrt{(\kappa RT)}$) of the inlet gas, as stated above. The actual state quantity ($\sqrt{(\kappa RT)}$) of the inlet gas is the sound velocity V of the inlet gas, as indicated by equation (3). Therefore, by sensing the sound velocity V of the inlet gas, the actual state quantity ($\sqrt{(\kappa RT)}$) of the inlet gas can be accurately acquired. Moreover, the responsiveness of the sensing of the sound velocity by the sound velocity meter 40 is extremely high with respect to changes in the sound velocity, so there is virtually no necessity to take into consideration delay in the control of the compressor associated with delay in the sensing of the sound velocity.

Therefore, in the present embodiment, the actual RPM N of the fuel gas compressor 30 is sensed with the RPM meter 45, and the sound velocity V of the inlet gas is sensed with the sound velocity meter 40, and the corrected RPM N0 is found based on these sensing results, and the limiting pressure ratio or the pre-limiting pressure ratio is found with respect to this corrected RPM N0.

Figure 5:
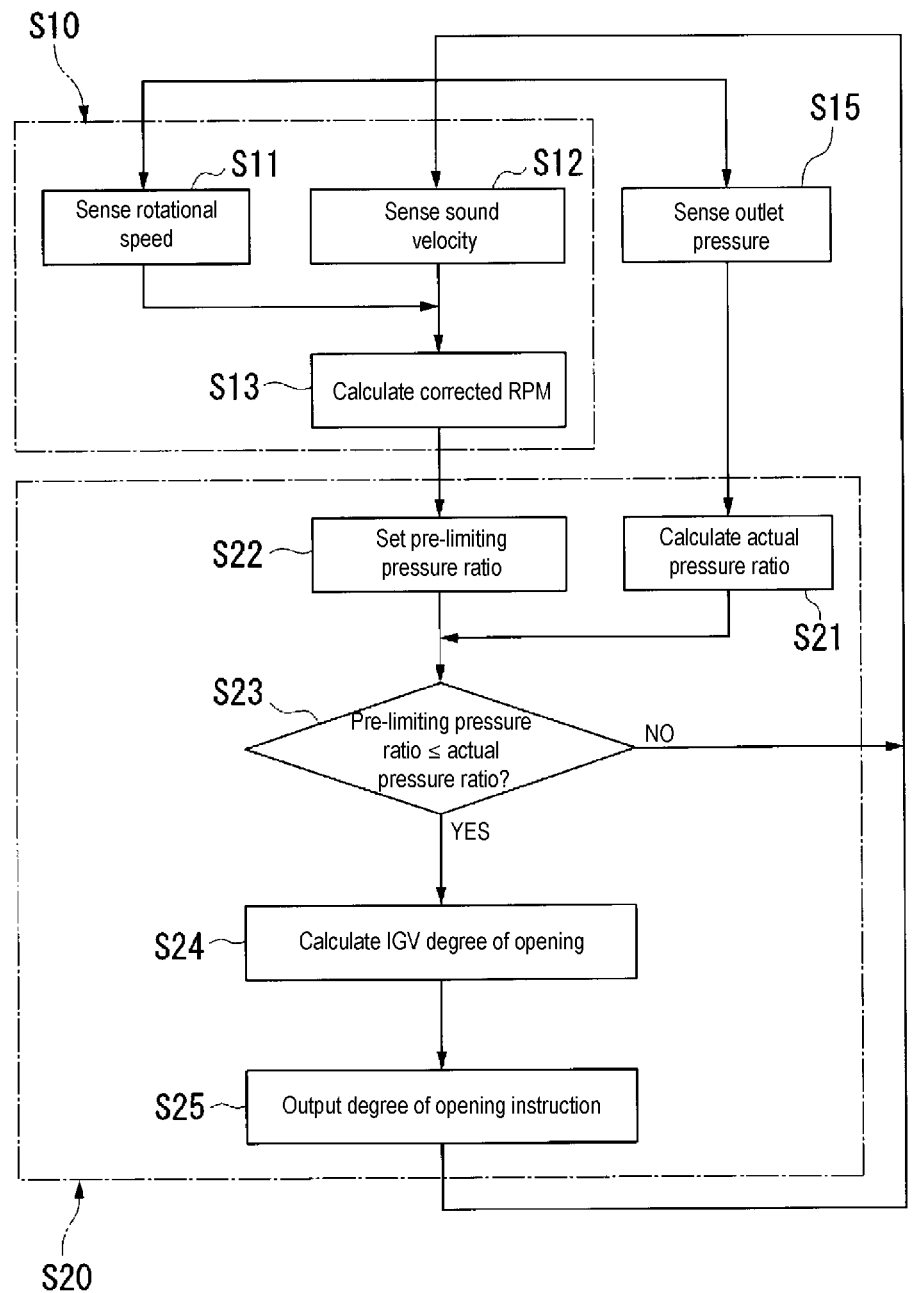
FIG. 5 is a flowchart illustrating the operation of a control device in the embodiment according to the present invention.

Next, the operation of the compressor control device 50 in the present embodiment is described in accordance with the flowchart illustrated in FIG. 5.

First, in the corrected RPM calculation device in the compressor control device 50, the corrected RPM N0 of the fuel gas compressor 30 is found (corrected RPM calculation step (S10)).

In the corrected RPM calculation step (S10), sensing of the RPM of the fuel gas compressor 30 by the RPM meter 45 (S11), and sensing of the sound velocity of the inlet gas by the sound velocity meter 40 (S12) are executed.

In the sensing of the RPM of the fuel gas compressor 30 by the RPM meter 45, the delay time in sensing of the RPM with respect to the change in the RPM is sufficiently small compared with the time required for the state of the inlet gas to change. Also, in the case of sensing of the sound velocity by the sound velocity meter 40, the delay time in the sensing of the sound velocity with respect to the change in the sound velocity is sufficiently small compared with the time required for the state of the inlet gas to change.

In the present embodiment, as described previously in connection with FIG. 2, the sonic transmitter 41 and the sonic receiver 42 of the sound velocity meter 40 are disposed opposite each other in a direction perpendicular to the axis Ap of the pipe 24a from which the fuel line 24 is configured. Therefore, in the present embodiment, an average value of the sound velocity of the inlet gas at each position in the cross-section of the pipe can be found. Also, in the present embodiment, if the composition of the inlet gas changes, the sound velocity of the inlet gas at only a specific position in the axial direction of the pipe 24a, in other words, in the direction of flow of the fuel gas within the pipe 24a, can be obtained. Therefore, the change in the sound velocity associated with a change in the composition of the inlet gas can be sensed more accurately than if the sonic transmitter 41 and the sonic receiver 42 are disposed opposite each other in the axial direction of the pipe 24a from which the fuel line 24 is configured.

Note that in the above, the sonic transmitter 41 and the sonic receiver 42 of the sound velocity meter 40 are disposed opposite each other in a direction perpendicular to the axis Ap of the pipe 24a. However, the sonic transmitter 41 and the sonic receiver 42 of the sound velocity meter 40 may be disposed on one side in a direction perpendicular to the axis Ap of the pipe 24a. In this case, the ultrasonic wave transmitted from the sonic transmitter 41 is received by the sonic receiver 42 after being reflected at the inner surface on the other side in the direction perpendicular to the axis Ap of the pipe 24a.

After sensing the RPM and sound velocity (S11, S12), the acceptance unit 52 of the compressor control device 50 receives the sensed RPM and sound velocity. Next, the corrected RPM computation unit 53 of the compressor control device 50 finds the corrected RPM in accordance with equation (2), using the RPM N and the sound velocity V received by the acceptance unit 52 (corrected RPM computation step (S13)). At this time, the corrected RPM computation unit 53 uses in equation (2) the reference specific heat ratio $\kappa 0$, the reference gas constant R0, and the reference temperature T0 that are stored in advance. Alternatively, a predetermined quantity is used as the reference state quantity ($\sqrt{(\kappa 0 R0\, T0)}$) in equation (2). In addition, the corrected RPM computation unit 53 uses the sensed sound velocity V ($=\sqrt{(\kappa RT)}$) of the inlet gas as the actual state quantity ($\sqrt{(\kappa RT)}$) of the inlet gas in equation (2).

This completes the corrected RPM calculation step (S10).

The pressure gauge 46 senses the outlet pressure of the fuel gas compressor 30 (S15), and the acceptance unit 52 of the compressor control device 50 receives this outlet pressure. Note that sensing of the outlet pressure (S15) is carried out at the same timing as sensing of the RPM (S11) and sensing of the sound velocity (S12) described previously.

Next, operation of the inlet flow rate regulator 31 is controlled as the final control element by the surge control unit 55 in the compressor control device 50, in accordance with the corrected RPM N0 (surge control step (S20)).

In the surge control step (S20), the surge control unit 55 of the compressor control device 50 finds the actual pressure ratio of the fuel gas compressor 30 using the outlet pressure received by the acceptance unit 52 (S21). The inlet pressure of the fuel gas compressor 30 in the gas turbine plant according to the present embodiment is substantially constant. Accordingly, the surge control unit 55 finds the actual pressure ratio using the inlet pressure stored in advance and the sensed outlet pressure (S21). Therefore, when the inlet pressure of the fuel gas compressor 30 is substantially constant, the outlet pressure can be treated as the "pressure ratio" in broad definition. Note that when the changes in the inlet pressure is comparatively large, it is desirable that in step 15, the inlet pressure together with the outlet pressure are sensed, and the actual pressure ratio is found using the sensed inlet pressure and outlet pressure.

Next, using the predetermined relationship between the corrected RPM and the limiting pressure ratio or the pre-limiting pressure ratio, the surge control unit 55 determines the limiting pressure ratio or the pre-limiting pressure ratio with respect to the corrected RPM found in the corrected RPM calculation step (S10) (S22).

Next, the surge control unit 55 compares the limiting pressure ratio or the pre-limiting pressure ratio determined in step 22 with the actual pressure ratio found in step 21 (S23). In this comparison, if the pre-limiting pressure ratio is defined in step 23, it is determined whether or not the actual pressure ratio is equal to or greater than the pre-limiting pressure ratio. Also, if the limiting pressure ratio is defined in step 23, it is determined whether or not the actual pressure ratio is equal to or greater than a pressure ratio that is smaller than the limiting pressure ratio by the predetermined amount, in other words, the pre-limiting pressure ratio.

In step 23, if the surge control unit 55 determines that the actual pressure ratio is not equal to or greater than the pre-limiting pressure ratio, in other words, that the actual pressure ratio is less than the pre-limiting pressure ratio, the procedure returns to the steps 11, 12, and 15.

When it is determined in step 23 that the actual pressure ratio is equal to or greater than the pre-limiting pressure ratio, there is a high possibility of the occurrence of surging in the fuel gas compressor 30, so the surge control unit 55 finds the control quantity of the final control element, in other words, finds the IGV degree of opening in the inlet flow rate regulator 31 (S24).

Figure 4:
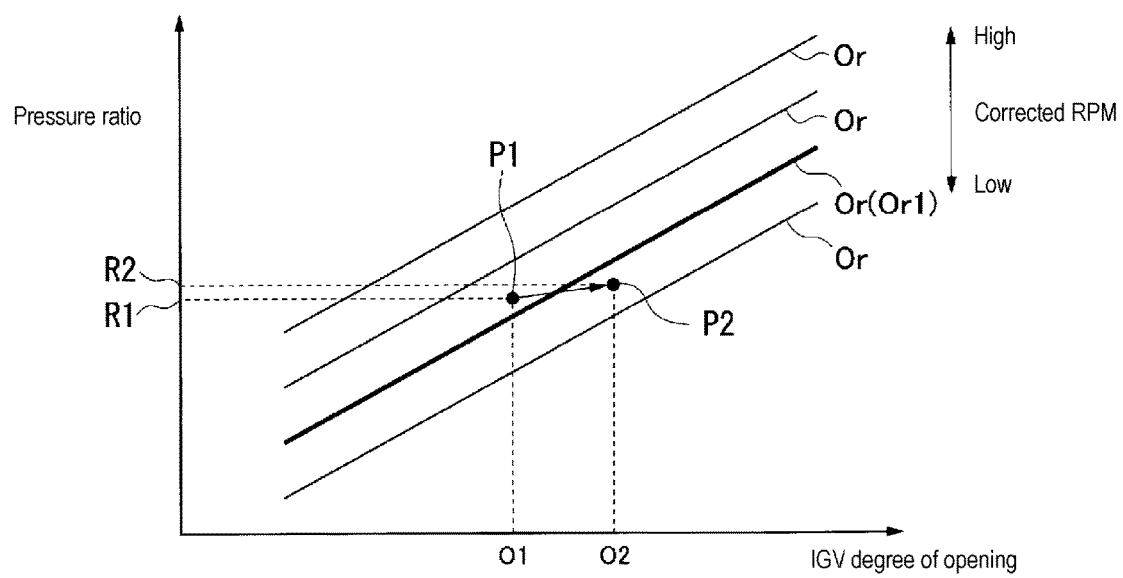
FIG. 4 is a graph showing limiting IGV degree of opening characteristic curves in the embodiment according to the present invention.

Here, the relationship between the IGV degree of opening and the limiting pressure ratio or the pre-limiting pressure ratio is described, using FIG. 4. In the graph shown in FIG. 4, the horizontal axis is the IGV degree of opening, and the vertical axis is the pressure ratio. Also, FIG. 4 shows limiting IGV degree of opening characteristic curves Or that show the relationship between the IGV degree of opening and the limiting pressure ratio or the pre-limiting pressure ratio for each corrected RPM.

As shown in FIG. 4, the relationship between the IGV degree of opening and the limiting pressure ratio or the pre-limiting pressure ratio at a certain corrected RPM is a relationship in which the limiting pressure ratio or the pre-limiting pressure ratio increases as the IGV degree of opening increases. Therefore, the limiting IGV degree of opening characteristic curve Or with respect to a certain corrected RPM is an upward sloping curve. The limiting IGV degree of opening curves Or for each corrected RPM are stored in advance in the surge control unit 55. Of the plurality of limiting IGV degree of opening curves Or, the limiting IGV degree of opening curve Or for a high corrected RPM has a higher pressure ratio with respect to the same IGV degree of opening than the limiting IGV degree of opening characteristic curve Or for a corrected RPM lower than this corrected RPM.

For example, in the graph shown in FIG. 4, the surge control unit 55 first extracts the limiting IGV degree of opening curve Or1 corresponding to the corrected RPM found in the corrected RPM calculation step (S10). Next, the position P1 corresponding to the pressure ratio R1 found in step 21 and the current IGV degree of opening O1 is plotted, and the position P1 and the position of the limiting IGV degree of opening curve Or1 are compared. In the graph shown in FIG. 4, when the position P1 is higher than the limiting IGV degree of opening curve Or1, the surge control unit 55 determines an IGV degree of opening O2 that is greater than the current IGV degree of opening O1. As a result, the pressure ratio is changed from R1 to R2, and the operation point changes to the new position P2. In the graph shown in FIG. 4, the position P2 is lower than the limiting IGV degree of opening curve Or1, so there is no possibility of surging.

Note that when the surge control unit 55 finds the IGV degree of opening, plotting as described above is not actually carried out on the graph shown in FIG. 4, but a process equivalent to plotting is carried out.

The surge control unit 55 outputs the IGV degree of opening determined in step 24 to the inlet flow rate regulator 31 (S25). As a result, the IGV degree of opening of the inlet flow rate regulator 31 becomes the IGV degree of opening output from the surge control unit 55, in other words, the IGV degree of opening is increased. When the IGV degree of opening is increased, the limiting pressure ratio or the pre-limiting pressure ratio with respect to this IGV degree of opening also increases, and the actual pressure ratio becomes smaller than the limiting pressure ratio or the pre-limiting pressure ratio, so the possibility of occurrence of surging in the fuel gas compressor 30 is reduced.

In the present embodiment as described above, of the parameters that define the corrected RPM, the actual state quantity ($\sqrt{\kappa RT}$) of the inlet gas, a variable parameter, is obtained by sensing the sound velocity V (=$\sqrt{\kappa RT}$) of the inlet gas. Thus, in the present embodiment, the corrected RPM can be more accurately found than when the actual state quantity ($\sqrt{\kappa RT}$) of the inlet gas is estimated using the temperature, the density, or the like of the inlet gas. Therefore, in the present embodiment, the potential for occurrence of surging caused by variation in the composition or variation in the temperature of the fuel gas can be accurately determined.

Also, in the present embodiment, of the parameters that define the corrected RPM, the actual state quantity ($\sqrt{\kappa RT}$) of the inlet gas and the RPM of the fuel gas compressor 30, the variable parameters, are sensed by the sound velocity meter 40 and the RPM meter 45 respectively. As stated previously, the delay times of the sound velocity meter 40 and the RPM meter 45 in responding to changes in the objects being sensed are extremely short. Thus, in the present embodiment, control delay of the fuel gas compressor 30 associated with the delay in sensing of these parameters can be minimized. Therefore, in the present embodiment, a control process can be executed against surging before the occurrence of surging, even when the potential for the occurrence of surging in the fuel gas compressor 30 increases due to changes in the state quantity of the fuel gas.

The composition and the like of BFG from a blast furnace of an ironworks can easily vary in accordance with the state of the blast furnace. Also, in the gas turbine plant according to the present embodiment, when the composition or the like of the BFG changes and the calorific value is reduced, the high calorie gas COG is mixed into the BFG to produce the fuel gas. In other words, in the gas turbine plant according to the present embodiment, the composition of the fuel gas sucked into the fuel gas compressor 30 can easily vary. Also, both the BFG and the COG are delivered to the fuel gas compressor 30 via a pipeline from the respective plants generating them, so the variation in the temperature in accordance with the status of operation of the blast furnace or the like is comparatively large. In other words, with the fuel gas compressor 30 according to the present embodiment, the potential for occurrence of surging caused by variation in the composition or variation in the temperature of the fuel gas is comparatively high. Therefore, executing the control process as described above is extremely beneficial for such a fuel gas compressor 30.

The output unit 54 of the compressor control device 50 outputs the corrected RPM found by the corrected RPM computation unit 53 or the actual pressure ratio, the IGV degree of opening, or the like found by the surge control unit 55, in accordance with external instructions. Therefore, in the present embodiment, an operator of the gas turbine 10 plant can check the status of the fuel gas compressor 30 from the output from the output unit 54.

At the stage when the fuel gas compressor 30 is new, the efficiency in accordance with the pressure ratio and the corrected RPM can be found using a predetermined relationship among the efficiency of the fuel gas compressor 30, the pressure ratio, and the corrected RPM. On the other hand, as the fuel gas compressor 30 is operated and adherence of foreign matter or the like contained in the fuel gas to the vanes and the like of the fuel gas compressor 30 increases, the performance of the fuel gas compressor 30 is degraded, and the efficiency of the fuel gas compressor 30 is reduced.

In the present embodiment, the degree of degradation in the performance of the fuel gas compressor 30 is determined by the following method.

Figure 6:
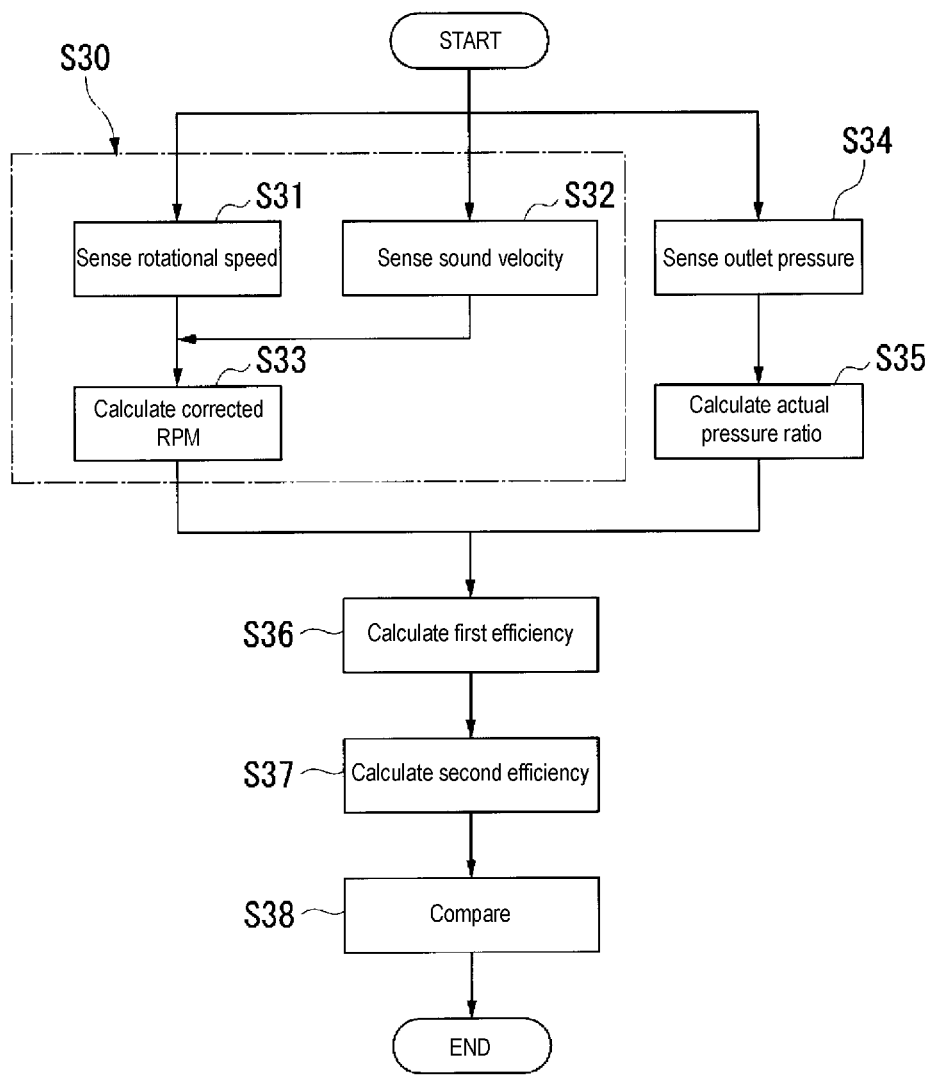
FIG. 6 is a flowchart illustrating a compressor degradation determination method in the embodiment according to the present invention.

As illustrated in the flowchart of FIG. 6, first, the RPM meter 45 senses the RPM of the fuel gas compressor 30 (S31). In addition, the sound velocity meter 40 senses the sound velocity of the inlet gas (S32), and the pressure gauge 46 senses the outlet pressure of the fuel gas compressor 30 (S34). Each of the sensed values is received by the acceptance unit 52 of the compressor control device 50.

Next, the corrected RPM computation unit 53 of the compressor control device 50 finds the corrected RPM of the fuel gas compressor 30 using the RPM sensed in step 31 and the sound velocity sensed in step 32, as described previously (S33). Note that the processes in steps 31, 32, and 33 constitute the corrected RPM calculation step (S30) in FIG. 6, which is the same as the corrected RPM calculation step (S10). In addition, the surge control unit 55 of the compressor control device 50 finds the actual pressure ratio of the fuel gas compressor 30 using the outlet pressure sensed in step 34 (S35). Note that in this case also, when the variation in the inlet pressure is comparatively large, preferably the actual pressure ratio is found using the sensed inlet pressure and outlet pressure, as in the process in step 21 of FIG. 5. Both the corrected RPM found by the corrected RPM computation unit 53 and the pressure ratio found by the surge control unit 55 are output from the output unit 54 of the compressor control device 50 in accordance with instructions from the operator or the like.

Next, the operator or the like of the gas turbine plant calculates the current efficiency of the fuel gas compressor (first efficiency calculation: S36) using each of the various parameters that indicate the current operating status of the fuel gas compressor 30.

In addition, the operator or the like calculates the efficiency of the fuel gas compressor 30 in accordance with the corrected RPM and pressure ratio output from the output unit 54, using the predetermined relationship among the efficiency of the fuel gas compressor 30, the pressure ratio, and the corrected RPM (second efficiency calculation: S37). This efficiency is the efficiency when the fuel gas compressor 30 is operated at the corrected RPM and pressure ratio output from the output unit 54 at the stage when the fuel gas compressor 30 is new, in other words, at the stage when the performance of the fuel gas compressor 30 is not degraded.

The operator or the like compares the efficiency of the current fuel gas compressor 30, and the efficiency of the fuel gas compressor 30 at the stage when the performance is not degraded (S38). Then, the operator or the like determines the extent to which the current efficiency of the fuel gas compressor 30 has reduced compared with the efficiency of the fuel gas compressor 30 at the stage when the performance is not degraded. The operator or the like carries out repairs or the like on the fuel gas compressor 30 in accordance with the degree of reduction in the current efficiency of the fuel gas compressor 30.

In the present embodiment, as described above, the accurate corrected RPM can be found, so the efficiency of the fuel gas compressor 30 can be accurately found. As a result, in the present embodiment, repairs and the like can be carried out on the fuel gas compressor 30 at the appropriate time in accordance with the degree of reduction in the current efficiency of the fuel gas compressor 30.

Note that here the first efficiency calculation (S36) is executed after computation of the corrected RPM (S33) and computation of the actual pressure ratio (S35), before calculation of the second efficiency (S37). However, the first efficiency calculation (S36) may be carried out at any stage before comparison of the two efficiencies (S38).

Also, here, the operator or the like executes the first efficiency calculation (S36) and the second efficiency calculation (S37), but they may be executed by the compressor control device 50. If the first efficiency calculation (S36) is executed by the compressor control device 50, each of the various parameters indicating the current operational status of the fuel gas compressor 30 may be received from the sensors and the like by the acceptance unit 52, and the current efficiency may be calculated using each of the various parameters. Also, if the second efficiency calculation (S37) is executed by the compressor control device 50, the relationship among the efficiency of the fuel gas compressor 30, the pressure ratio, and the corrected RPM may be stored in advance in the compressor control device 50, and using this relationship, the efficiency in accordance with the corrected RPM and the pressure ratio may be calculated.

First Modification

Figure 7:
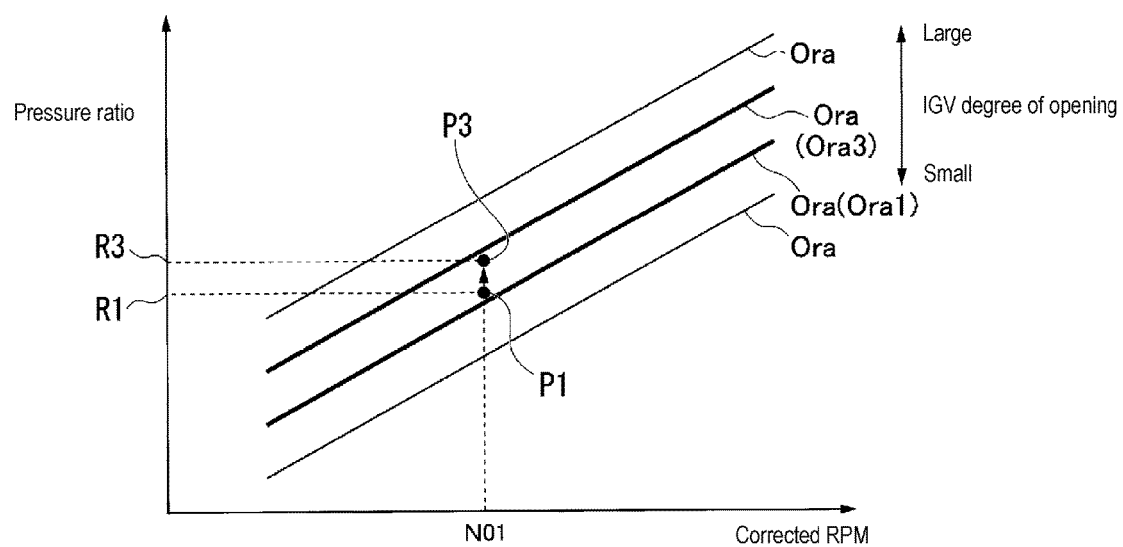
FIG. 7 is a graph showing limiting IGV degree of opening characteristic curves in a modification of the embodiment according to the present invention.

This modification is a modification of the computation of the IGV degree of opening (S24) shown in FIG. 7.

As explained using FIG. 4, of the plurality of limiting IGV degree of opening curves Or, the limiting IGV degree of opening curve Or for a high corrected RPM has a higher pressure ratio with respect to the same IGV degree of opening than the limiting IGV degree of opening characteristic curve Or for a corrected RPM lower than this corrected RPM. Therefore, the relationship between the corrected RPM and the limiting pressure ratio or the pre-limiting pressure ratio at a certain IGV degree of opening is a relationship in which the limiting pressure ratio or the pre-limiting pressure ratio increases as the corrected RPM increases. Thus, in the graph of FIG. 7, the limiting IGV degree of opening curve Ora, which indicates the relationship between the corrected RPM and the limiting pressure ratio or the pre-limiting pressure ratio at a certain IGV degree of opening, is an upward sloping curve. Note that in the graph shown in FIG. 7, the horizontal axis is the corrected RPM, and the vertical axis is the pressure ratio.

The limiting IGV degree of opening curves Ora for each IGV degree of opening are stored in advance in the surge control unit 55 according to this modification. Of the plurality of limiting IGV degree of opening curves Ora, the limiting IGV degree of opening curve Ora for a large IGV degree of opening has a higher pressure ratio with respect to the same corrected RPM than the limiting IGV degree of opening characteristic curve Ora for an IGV degree of opening lower than this IGV degree of opening.

In this modification, the surge control unit 55 first extracts the limiting IGV degree of opening curve Ora1 corresponding to the current IGV degree of opening O1 (not shown), on the graph shown in FIG. 7. Next, the position P1 corresponding to the pressure ratio R1 found in step 21 and the corrected RPM N01 found in step 13 is plotted, and the position P1 and the position of the limiting IGV degree of opening curve Ora1 are compared. In the graph shown in FIG. 7, when the position P1 is higher than the limiting IGV degree of opening curve Ora1, an IGV degree of opening O3 (not shown) that is greater than the current IGV degree of opening O1 is determined. By making the actual IGV degree of opening equal to O3, the pressure ratio changes from R1 to R3, and the operation point changes to the new position P3. In the graph shown in FIG. 7, the position P3 is lower than the limiting IGV degree of opening curve Ora3 corresponding to the newly determined IGV degree of opening O3, so there is no possibility of surging.

Second Modification

In both the embodiment and the first modification as described above, when the potential for the occurrence of surging in the fuel gas compressor 30 increases, the inlet flow rate regulator 31, which is one of the final control elements, is controlled to reduce the potential for the occurrence of surging in the fuel gas compressor 30. However, another final control element may be controlled to reduce the potential for occurrence of surging of the fuel gas compressor 30.

Such final control elements include, for example, the recirculation flow rate regulation valve (recirculation flow rate regulator) 48, the extraction flow rate regulation valve (extraction flow rate regulator) 49, the supply flow rate regulation valve 47, and the clutch 38.

When the valve degree of opening of the recirculation flow rate regulation valve 48 is increased, the outlet pressure of the fuel gas compressor 30 is reduced while the inlet pressure is increased. Therefore, by increasing the valve degree of opening of the recirculation flow rate regulation valve 48, the pressure ratio of the fuel gas compressor 30 is reduced, and the potential for occurrence of surging can be reduced. Also, when the valve degree of opening of the extraction flow rate regulation valve 49 is increased, the outlet pressure of the fuel gas compressor 30 is reduced. Therefore, by increasing the valve degree of opening of the extraction flow rate regulation valve 49, the pressure ratio of the fuel gas compressor 30 is reduced, and the potential for occurrence of surging can be reduced.

When the recirculation flow rate regulation valve 48 or the extraction flow rate regulation valve 49 is used as the final control element, if the surge control unit 55 determines that the actual pressure ratio is equal to or greater than the pre-limiting pressure ratio in step 23 in FIG. 5, the surge control unit 55 outputs an instruction to the recirculation flow rate regulation valve 48 or the extraction flow rate regulation valve 49 to increase the valve degree of opening. In this case, the surge control unit 55 determines the valve degree of opening of the recirculation flow rate regulation valve 48 or the extraction flow rate regulation valve 49 in accordance with predetermined rules such as those shown in FIG. 4 or FIG. 7. As a result, the valve degree of opening of the recirculation flow rate regulation valve 48 or the valve degree of opening of the extraction flow rate regulation valve 49 is increased, so the flow rate of the fuel gas passing through the valves 48, 49 increases, and the potential for the occurrence of surging is reduced.

When the supply flow rate regulation valve 47 is closed, the flow rate of fuel gas supplied to the combustor 12 of the gas turbine 10 is reduced, and as a result, the pressure within the combustor 12 is gradually reduced, and the outlet pressure of the fuel gas compressor 30 is reduced. When the supply flow rate regulation valve 47 is used as the final control element, if the surge control unit 55 determines that the actual pressure ratio is equal to or greater than the pre-limiting pressure ratio in step 23, the surge control unit 55 outputs an instruction to close the supply flow rate regulation valve 47, in other words, a trip instruction. As a result, the supply flow rate regulation valve 47 is closed, and surging of the fuel gas compressor 30 can be prevented.

When the clutch 38 is opened, the driving force of the fuel gas compressor 30 is eliminated, so surging of the fuel gas compressor 30 does not occur. Therefore, when the clutch 38 is used as the final control element, if the surge control unit 55 determines that the actual pressure ratio is equal to or greater than the pre-limiting pressure ratio in step 23, the surge control unit 55 outputs an instruction to open the clutch 38, in other words, a trip instruction. As a result, the clutch 38 is opened, and surging of the fuel gas compressor 30 can be prevented.

Note that when the supply flow rate regulation valve 47 or the clutch 38 is operated as a result of a trip instruction, the fuel gas compressor 30 together with the gas turbine 10 is tripped.

As described above, there are various kinds of final control element apart from the inlet flow rate regulator 31 that can be used as the final control element to be subject to control in the surge control. Note that in the above, when controlling surge, any one of final control elements was controlled, but two or more final control elements from among the plurality of final control elements may be controlled. By controlling two or more final control elements in this way, the potential for occurrence of surging can be reduced compared with controlling a single final control element.

Other Modifications

In the gas turbine plant as described above, two types of gas, BFG and COG, are used as the fuel gas of the gas turbine 10. However, another fuel gas may be used as a fuel gas of the gas turbine 10, for example, a gas produced by a petroleum residue IGCC, a gas from gasification of liquid fuel, or a biogas such as a combustible gas obtained by fermenting organic waste (such as raw garbage), livestock manure, or the like.

Also, in the embodiment as described above, an example was described in which the fuel gas compressor 30 in the gas turbine plant was controlled, but similar control may be carried out on the air compressor 11 of the gas turbine plant. In addition, similar control may be carried out on a gas compressor in other plant, such as a chemical plant.

Also, the control as described above is extremely effective for control of compressors in which the composition of the inlet gas varies, but the control as described above may also be used for control of compressors where the temperature of the inlet gas only changes, for example.

Also, the present invention is not limited to axial flow compressors, but may also be applied to centrifugal compressors.

INDUSTRIAL APPLICABILITY

According to one aspect of the present invention, an accurate corrected RPM can be found in an extremely short period of time, even if the temperature, the composition, or the like of the inlet gas varies.

REFERENCE SIGNS LIST

10 Gas turbine
11 Air compressor
12 Combustor
13 Turbine
19 Generator
20 Fuel gas equipment
21 BFG line
22 COG line
24 Fuel line
25 Fuel supply line
26 Fuel return line
27 Extraction line
30 Fuel gas compressor (or simply compressor)
31 Inlet flow rate regulator
38 Clutch
39 Speed reducer
40 Sound velocity meter
41 Sonic transmitter
42 Sonic receiver
43 Computer
45 RPM meter
46 Pressure gauge
47 Supply flow rate regulation valve
48 Recirculation flow rate regulation valve (recirculation flow rate regulator)
49 Extraction flow rate regulation valve 50 Compressor control device
51 Corrected RPM computation device
52 Acceptance unit
53 Corrected RPM computation unit
54 Output unit
55 Surge control unit

The invention claimed is:

1. A corrected RPM calculation device, comprising:
an RPM meter;
a sound velocity meter;
an acceptance unit that receives (i) an RPM of a compressor, the RPM of the compressor being sensed by the RPM meter and (ii) a sound velocity of an inlet gas sucked into the compressor, the sound velocity of the inlet gas being sensed by the sound velocity meter; and
a corrected RPM computation unit that finds a corrected RPM of the compressor using (i) the sound velocity received by the acceptance unit, (ii) the RPM received by the acceptance unit, and (iii) a reference state quantity determined by a reference specific heat ratio, a reference gas constant, and a reference temperature of the inlet gas in a reference state.

2. The corrected RPM calculation device according to claim 1, wherein
the sound velocity meter includes a sonic transmitter and a sonic receiver that are attached to a pipe through which the inlet gas flows, the sonic transmitter and the sonic receiver being disposed opposite to each other in a direction perpendicular to an axis of the pipe.

3. The corrected RPM calculation device according to claim 1, further comprising
an output unit that outputs the corrected RPM found by the corrected RPM computation unit.

4. A compressor control device, comprising:
the corrected RPM calculation device according to claim 1; and
a surge control unit that controls a final control element to prevent surging of the compressor, wherein
the acceptance unit receives at least an outlet pressure of the compressor sensed by a pressure gauge,
the surge control unit determines a limiting pressure ratio or a pre-limiting pressure ratio that is smaller than the limiting pressure ratio by a predetermined amount, with respect to the corrected RPM found by the corrected RPM calculation device, using a predetermined relationship between the corrected RPM and the limiting pressure ratio or the pre-limiting pressure ratio of the compressor,
the surge control unit compares the limiting pressure ratio or the pre-limiting pressure ratio with the actual pressure ratio of the compressor determined from the outlet pressure received by the acceptance unit, and
the surge control unit controls the final control element in accordance with the comparison result.

5. The compressor control device according to claim 4, wherein
the final control element includes an inlet flow rate regulator that regulates the flow rate of the inlet gas, and
the surge control unit outputs to the inlet flow rate regulator an instruction to increase the flow rate of the inlet gas in accordance with the comparison result.

6. The compressor control device according to claim 4, wherein
the final control element includes a recirculation flow rate regulator that regulates the flow rate of gas returned to the inlet side of the compressor from among the gas output from the compressor, and
the surge control unit outputs an instruction to the recirculation flow rate regulator to increase the flow rate of the gas returned to the inlet side in accordance with the comparison result.

7. The compressor control device according to claim 4, wherein
the final control element includes an extraction flow rate regulator that regulates the flow rate of the gas extracted from the compressor, and
the surge control unit outputs an instruction to the extraction flow rate regulator to increase the flow rate of the gas extracted in accordance with the comparison result.

8. The compressor control device according to claim 4, wherein
the final control element includes a trip final control element that stops the compressor, and
the surge control unit outputs an instruction to the trip final control element to execute an operation to stop the compressor in accordance with the comparison result.

9. The compressor control device according to claim 4, wherein
the surge control unit determines a pre-limiting pressure ratio with respect to the corrected RPM found by the corrected RPM calculation device, and outputs an instruction to the final control element when the actual pressure ratio becomes equal to or greater than the pre-limiting pressure ratio.

10. The compressor control device according to claim 4, further comprising:
an efficiency calculation unit that calculates an efficiency of the compressor in accordance with the corrected RPM found by the corrected RPM computation unit and the actual pressure ratio of the compressor determined from the outlet pressure received by the acceptance unit, using a predetermined relationship among the corrected RPM, the pressure ratio, and the efficiency of the compressor; and
an output unit that outputs the efficiency calculated by the efficiency calculation unit.

11. Compression equipment, comprising:
the compressor control device according to claim 4;
the compressor; and
the final control element.

12. The compression equipment according to claim 11, wherein
the compressor compresses fuel gas, which is burned by a combustor, as the gas.

13. A corrected RPM calculation method, comprising:
an RPM sensing step of sensing, using an RPM meter, an RPM of a compressor;
a sound velocity sensing step of sensing, using a sound velocity meter, a sound velocity of an inlet gas that is a gas sucked into the compressor; and
a corrected RPM computation step of finding a corrected RPM of the compressor using (i) the sound velocity received from the sound velocity meter, (ii) the RPM received from the RPM meter, and (iii) a reference state quantity determined by a reference specific heat ration, a reference gas constant, and a reference temperature of the inlet gas in a reference state.

14. A compressor control method, executing:
the corrected RPM calculation method according to claim 13;
an outlet pressure sensing step of sensing an outlet pressure of the compressor; and a surge control step of controlling an operation of a final control element to prevent surging of the compressor, wherein in the surge control step, a limiting pressure ratio or a pre-limiting pressure ratio that is smaller than the limiting pressure ratio by a predetermined amount is determined, with respect to the corrected RPM found by executing the corrected RPM calculation method, using a relationship between the corrected RPM and the limiting pressure ratio or the pre-limiting pressure ratio of the compressor, in the surge control step, the limiting pressure ratio or the pre-limiting pressure ratio is compared with an actual pressure ratio of the compressor determined from the outlet pressure sensed in the outlet pressure sensing step, and in the surge control step, the final control element is controlled in accordance with the comparison result.

15. The compressor control method according to claim 14, wherein in the surge control step, the pre-limiting pressure ratio with respect to the corrected RPM found by executing the corrected RPM calculation method is determined, and in the surge control step, if the actual pressure ratio becomes equal to or greater than the pre-limiting pressure ratio, an instruction is output to the final control element.

16. A compressor degradation determination method, executing:

the corrected RPM calculation method according to claim 13;

an outlet pressure sensing step of sensing an outlet pressure of the compressor;

a pressure ratio computation step of finding an actual pressure ratio of the compressor determined from the outlet pressure sensed in the outlet pressure sensing step;

a first efficiency calculation step of calculating an actual efficiency of the compressor;

a second efficiency calculation step of calculating an efficiency of the compressor in accordance with the corrected RPM found by executing the corrected RPM calculation method and the pressure ratio found in the pressure ratio computation step, using a predetermined relationship among the corrected RPM, the pressure ratio, and the efficiency of the compressor; and a comparison step of comparing the efficiency calculated in the first efficiency calculation step and the efficiency calculated in the second efficiency calculation step.

* * * * *